United States Patent [19]

Shenoi et al.

[11] Patent Number: 5,029,204
[45] Date of Patent: Jul. 2, 1991

[54] OPERATIONAL STATUS CONTROLLER FOR ECHO CANCELING

[75] Inventors: Kishan Shenoi, Milpitas; Terrence G. Sopira, Mt. View, both of Calif.

[73] Assignee: DSC Communications Corporation, Plano, Tex.

[21] Appl. No.: 427,620

[22] Filed: Oct. 26, 1989

[51] Int. Cl.[5] .............................................. H04M 1/00
[52] U.S. Cl. .................................. 379/407; 379/410; 370/32.1
[58] Field of Search ............... 379/406, 407, 408, 410, 379/411, 2, 3, 29; 370/32.1; 455/36

[56] References Cited

U.S. PATENT DOCUMENTS

| | | | |
|---|---|---|---|
| 3,700,810 | 10/1972 | Richeson, Jr. et al. | 379/407 |
| 3,783,194 | 1/1974 | Vilips et al. | 379/93 |
| 3,927,265 | 12/1975 | Roedel et al. | 379/407 |
| 3,987,398 | 10/1976 | Fung | 455/36 |
| 4,560,842 | 12/1985 | Homer | 379/29 |

OTHER PUBLICATIONS

Digital Echo Canceler EC7600-M2 Description and Operation Instruction Manual, Granger Associates, GRAC 098-2671, Revision A, May 1986.

Primary Examiner—Jin F. Ng
Assistant Examiner—Jhancy Augustus
Attorney, Agent, or Firm—Baker & Botts

[57] ABSTRACT

An apparatus for controlling the operational status of echo canceling in an echo canceler is disclosed. A digital signal processor (DSP) module (52) is configured to provide two bandlimited filters (66, 68). A CAT filter (66) detects the exclusive presence of a continuity assurance. Test (CAT) tone, and a disable filter (68) detects the exclusive presence of an echo canceling disable tone. Outputs from the DSP module (52) couple to a controller module (64), and a control output from the controller module (64) couples to an echo canceler module (54). The control output causes the echo canceler module (54) either to provide echo canceling or to bypass echo canceling. Upon detection of the CAT tone (106), the control module (64) enables echo canceling (88). After the CAT tone disappears (90), the control module (64) monitors the disable filter (68) to determine whether the disable tone is being transmitted (94). If the disable tone is detected, the control module (64) disables echo canceling (100). After the disable tone disappears (102), the control module (64) monitors the CAT filter (66) to determine whether the CAT tone is being transmitted (106).

16 Claims, 2 Drawing Sheets

OPERATIONAL STATUS CONTROLLER FOR ECHO CANCELING

TECHNICAL FIELD OF THE INVENTION

The present invention relates generally to the field of telecommunications. More specifically, the present invention relates to echo canceling within telecommunications networks and to the enabling disabling of echo cancelers.

BACKGROUND OF THE INVENTION

Echo in a telecommunications network is a natural consequence of converting between a four-wire communication path and a two-wire communication path. Due to physical characteristics of human hearing mechanisms, echo can have a detrimental influence on voice communications. Consequently, a telecommunications network may include a device known as an echo canceler in a communication path to eliminate the echo in one direction of the path.

Digitally implemented echo cancelers are commonly employed in four-wire communication trunks to cancel echo in one direction for the channels carried by the trunk. Generally, such echo cancelers utilize an adaptive filter which monitors incoming signals to simulate the actual echo expected in outgoing signals. This simulated echo is subtracted from the outgoing signal to remove the actual echo, and the simulated echo is continuously adapted to keep the outgoing signal substantially echo-free with substantially zero loss in the outgoing signal's amplitude. As a result, voice communication greatly improves.

While echo canceling serves a valuable role in enhancing voice communication, it often harms the communication of digital data through a telecommunications network. Modems and other data communication devices which couple to a telecommunications network have markedly different characteristics from those exhibited by the human hearing mechanisms. Specifically, such data communication devices do not necessarily suffer a significant deterioration in communication when moderate amounts of echo are present. Additionally, such data communication devices do not exhibit the same half-duplex nature of communication as is characteristically exhibited by human voice communication. Thus, data communication, especially that which utilizes sophisticated techniques to transfer data at rates of 4800 bits/second or more, improves when a communication path omits echo canceling.

In order to accommodate both voice and data communication, echo cancelers employ circuits which control their operational status. Such circuits determine when to disable or bypass echo canceling and when to enable echo canceling. The telecommunications industry follows reasonable well-defined standards to control the disabling of echo canceling. In one commonly used technique, those data communication devices which require disabling of echo cancelers transmit a disabling signal through the telecommunication network as a preamble to data communication. CCITT recommendation G.164 defines this signal as being a simple 2100 Hz tone, while CCITT recommendation G.165 defines this signal as being a 2100 Hz tone with embedded phase reversals. Accordingly, echo canceler control circuits monitor the communication paths in which they are inserted for the presence of an appropriate disabling signal, and disable echo canceling when the disabling signal is detected.

On the other hand, no well-defined standards for enabling echo canceling exist. Rather, a variety of unacceptably expensive and unreliable techniques are used to enable echo canceling. For example, one technique requires the monitoring of signalling bits or common channel signalling (CCS) to detect when a communication channel changes from a busy to an idle state, or the like. Separate processors are required to monitor such signaling bits, and such signalling bits are often encrypted so that the monitoring of such signals requires the incorporation of undesirably expensive processing capabilities within the echo canceler.

Another technique calls for modification of central office switching facilities to transmit specifically defined codes, which are recognizable to an echo canceler, at the termination of calls. While such codes may be more easily decoded by an echo canceler than the signaling bits discussed above, great expense and complication is typically required in order to modify the operation of central office switching facilities.

Yet another technique enables echo canceling only when speech is recognized at the echo canceler. However, this technique again requires substantial and sophisticated processing power to implement circuits which reliably recognize speech as opposed to data communication. Moreover, this technique leads to poorer communication services because echo is present at the beginning of each voice conversation until the echo canceling becomes enabled.

Still another technique enables echo canceling after monitoring the energy being transmitted though the channel. When substantially no energy has been transmitted for an appropriate period of time, a call is assumed to have been concluded, and echo canceling is enabled. While most data communication does not have significant delays in the transmission of data, nothing insures that such delays cannot happen. Specifically, such delays often occur during half-duplex data transmissions when substantial delays are present in the long-haul side of the transmission path. Consequently, this technique is undesirably unreliable.

SUMMARY OF THE INVENTION

Accordingly, it is a advantage of the present invention that an improved circuit for controlling the operational status of an echo canceler is provided.

Another advantage of the present invention is that control of echo canceling is provided without requiring modification of other components of a telecommunications network.

Yet another advantage is that the present invention reliably enables echo canceling without analyzing the content or nature of communication being transported through a communication path.

Still another advantage is that the present invention may implement an echo canceling enabling function using circuits which serve other purposes for the echo canceler. A relatively inexpensive control circuit results.

The above and other advantages of the present invention are carried out in one form by a method of controlling echo canceling in a channel of a telecommunications network. The method monitors the channel for the presence of signals which exhibit a first frequency. The method additionally monitors the channel for the presence of signals which exhibit a second frequency. In further steps, the method enables echo canceling when the first frequency is detected, and disables echo canceling when the second frequency is detected.

The above and other advantages of the present invention are carried out in another form by an apparatus which controls the operational status of an echo canceler. The apparatus includes a device for receiving a first signal. The echo canceler monitors this first signal in order to selectively remove echo from a second signal. The apparatus also includes first and second filters. Each of the first and second filters couples to the first signal receiving device. The first filter indicates when the first signal exhibits a first frequency, and the second filter indicates when the first signal exhibits a second frequency. These first and second frequencies are different from one another. A controller couples to both of the first and second filters. The controller is configured so that it enables the echo canceler when the first filter detects the first frequency and disables the echo canceler when the second filter detects the second frequency.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
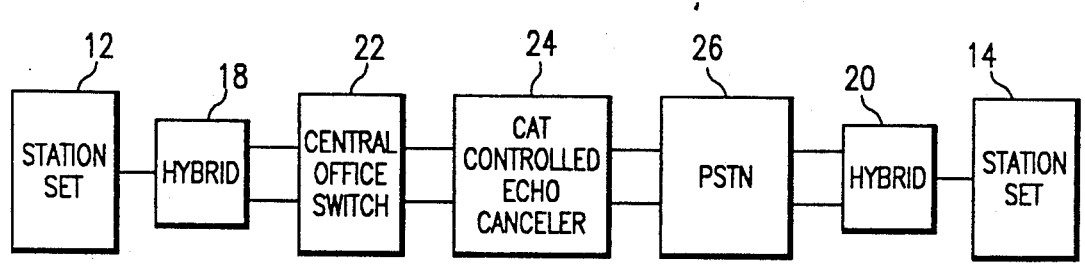
FIG. 1 shows a block diagram of a telecommunications system which includes the present invention.

FIG. 1 shows a block diagram of a telecommunications system 10, which allows a station set 12 to communicate with a station set 14. Station sets 12 and 14 represent conventional two-wire telecommunications devices which may communicate either voice or data. Station sets 12 and 14 each couple to a common channel signaling (CCS) telecommunications network 16. Of course, a great multiplicity of additional station sets (not shown) may also couple to network 16.

Network 16 provides appropriate call switching and call routing so that a communication channel forms between station sets 12 and 14. Network 16 operates substantially as a four-wire circuit. Thus, a two-wire side of a first two-wire to four-wire hybrid 18 of network 16 couples to station set 12, and a two-wire side of a second two-wire to four-wire hybrid 20 of network 16 couples to station set 14. Hybrids 18 and 20 are conventional hybrid circuits which convert between two-wire and four-wire communication circuits. As discussed above, this conversion causes echo. A four-wire side of hybrid 18 couples to a first port of a near-end central switching office 22, and a second port of office 22 couples to a near-end port of a CAT-controlled echo canceler 24.

Central switching office 22 is a conventional telecommunications network switch. In the preferred embodiment, the second port of switching office 22 operates at the DS1 level, in which a plurality of discrete communication channels are time-domain multiplexed together in a single high-speed trunk. Echo canceler 24 selectively removes echo from signals transmitted toward station set 14. A far-end port of echo canceler 24 couples to other portions of the public switching telecommunications network (PSTN) 26. PSTN 26 may include any number of communication links, switching offices, and the like, in a communication channel which eventually couples to a four-wire side of hybrid 20. Specifically, PSTN 26 may include another echo canceler to remove echo from signals transmitted toward station set 12.

Figure 2:
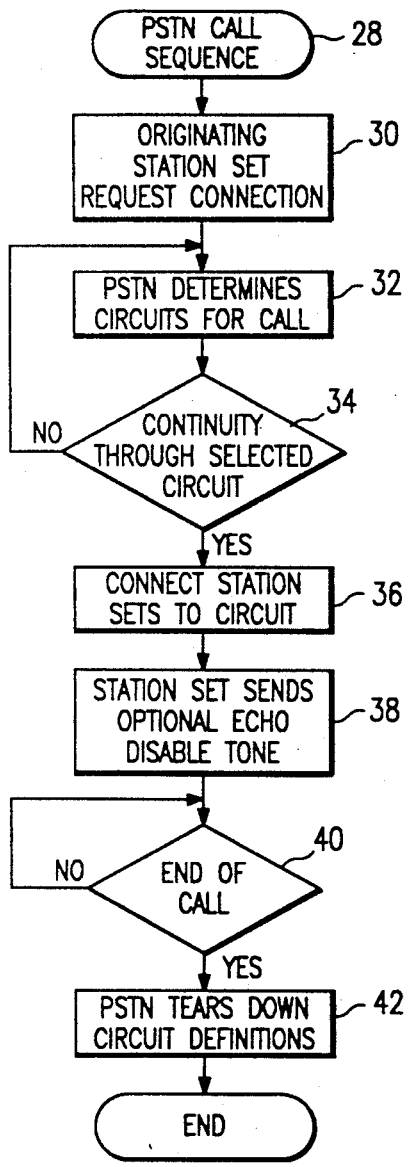
FIG. 2 shows a flow diagram of tasks performed by the system of FIG. 1.

FIG. 2 shows a flow chart 28 of tasks undertaken by system 10 in connection with making a call between station sets 12 and 14. As shown in a task 30, one of station sets 12 and 14 first requests a connection between itself and the other one of station sets 12 and 14. Assuming that station set 12 originates the call, then station set 12 first goes off-hook. This off-hook condition is detected by central office 22, which then supplies a dial tone to station set 12. Station set 12 responds by supplying the phone number of station set 14.

After task 30, a task 32 defines the connections needed to establish a communication channel between station sets 12 and 14. This definition occurs in switching office 22 and in other switching offices included in PSTN 26. After task 32, a task 34 is performed by switching office 2 in cooperation with other switching offices included in PSTN 26 to verify that a valid communication channel has been defined. Task 34 generates a continuity assurance test (CAT) tone for application to the newly defined communication channel so that continuity may be tested. The telecommunications industry recognizes standard parameters for the CAT tone Specifically, the CAT tone is a simple sinusoid waveform exhibiting 2010 Hz at -12 dBm0 for at least 60 msec. If continuity cannot be verified in task 34, then task 32 may be repeated to establish alternate connections between station sets 12 and 14. Of course, if a reasonable number of attempts fail to obtain a verifiable communication channel, provisions may be made to return a busy signal (not shown) to the originating station set.

After task 34 verifies continuity through the selected communication channel, then a task 36 connects station sets 12 and 14 to the selected communication channel, and the call commences. After task 36, an optional task 38 may be performed by one or more of station sets 12 and 14. Task 38 sends an echo disable tone through the selected communication channel to disable any echo canceling which may be present in the communication channel. Task 38 would not be performed when station sets 12 and 14 are voice communication phone instruments. Thus, echo canceling occurs for voice communication. However, task 38 may be performed when station sets 12 and 14 are modems or like data communication devices, especially when such devices communicate data at rates of 4800 bits per second or more. When task 38 is performed, no echo canceling occurs throughout the remainder of the call. In the preferred embodiment, task 38 follows accepted industry standards in generating the disable tone. For example, CCITT recommendation G.164 defines the disable tone as being a simple 2100 Hz tone, while CCITT recommendation G.165 defines the disable tone as being a 2100 Hz tone with embedded phase reversals.

The disable tone of task 38 operates as a preamble for subsequent data which are transmitted through the selected communication channel of network 16. Such subsequent data or other communications are transferred while network 16 performs task 40. In task 40 switching office 22 and PSTN 26 monitor station sets 12 and 14, respectively, to determine when one of station sets 12 and 14 goes on-hook, signifying the end of the call. When the call ends, a task 42 is performed by network 16. Task 42 tears down the connection definitions used in establishing the communication channel so that such connections may be used for other calls.

Figure 3:
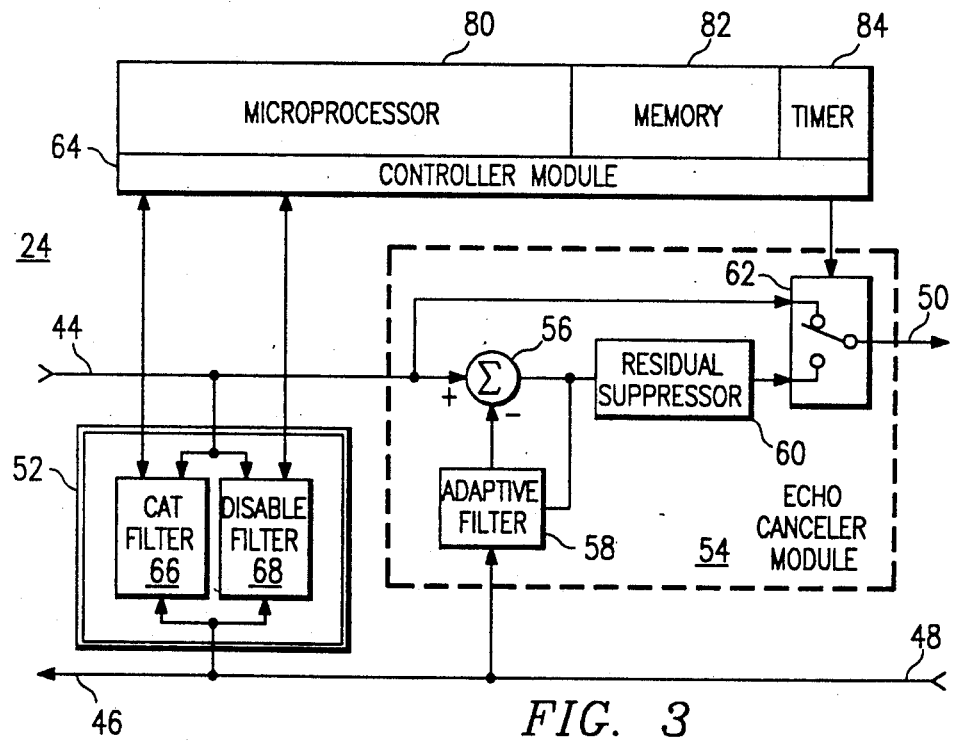
FIG. 3 shows a block diagram of a CAT-controlled echo canceler constructed in accordance with the teaching of the present invention.

FIG. 3 shows a block diagram of CAT-controlled echo canceler 24 which is constructed in accordance with the teaching of the present invention, and which operates in the environment of telecommunications system 10 discussed above in connection with, FIGURES 1 and 2. In the preferred embodiment, CAT-controlled echo canceler 24 is implemented digitally for each channel carried by a trunk upon which canceler 24 is installed. Those skilled in the art will understand that digital circuits or software programming in connection with digital circuits may be implemented in any number of configurations to achieve the functions discussed below.

CAT-controlled echo canceler 24 includes a near-end input terminal 44, a near-end output terminal 46, a far-end input terminal 48, and a far-end output terminal 50. Near-end terminals 44 and 46 together serve as the near-end port discussed above, and far-end terminals 48 and 50 together serve as the far-end port discussed above. Near-end input 44 couples to a first data input of a digital signal processor (DSP) module 52 and to a first data input of an echo canceler module 54. Far-end input 48 couples to a second data input of DSP module 52, to a second data input of echo canceler module 54, and to near-end output 46.

Echo canceler module 54 provides conventional echo canceling, which is well understood by those skilled in the art. Consequently, FIG. 3 illustrates only representative components of echo canceler module 54. Specifically, the first data input of module 54 couples to a positive input of an adder 56, and the second data input of module 54 couples to an input of an adaptive filter 58. An output of adaptive filter 58 couples to a negative input of adder 56, and an output of adder 56 couples back to a second input of adaptive filter 58 and to an input of a residual suppressor 60. The first data input of module 54 additionally couples to a first signal input of a switch 62, and an output of residual suppressor 60 couples to a second signal input of switch 62. A signal output of switch 62 couples to far-end output 50.

Generally speaking, adaptive filter 58 monitors an input signal received from far-end input 48 to generate a simulated echo signal which it supplies to adder 56. This simulated echo signal is subtracted out from the output signal supplied at far-end output 50 by adder 56. Adaptive filter 58 receives feedback from the output of adder 56 to adapt the simulated signal so that the output signal remains substantially echo free. Residual suppressor 60 removes residual components of echo which are caused essentially by quantizing noise inherent in T-carrier transmission. Echo has been substantially removed from the signal generated by residual suppressor 60. This signal passes through switch 62 to far-end output 50 when echo canceling is enabled. Of course, nothing prevents echo canceling module 54 from including additional conventional features, such as double-talk detection and dynamic noise matching, which are known to those skilled in the art. Moreover, echo canceler module 54 may be implemented using either digital circuits, software programming in general purpose computer devices, or a combination of both.

A controller module 64 manages the operational status of echo canceler module 54. Specifically, a control output from controller module 64 couples to a control input of switch 62 to specify whether switch 62 routes the signal received from near-end input 44 directly to far-end output 50 or whether switch 62 routes the output signal from residual suppressor 60 to far-end output 50. When switch 62 passes the signal received from near-end input 44 to far-end output 50, echo canceling is bypassed, and the operational status of CAT-controlled echo canceler 24 is disabled. When switch 62 passes the signal received from the output of residual suppressor 60 to far-end output 50, the operational status of CAT-controlled echo canceler 24 is enabled.

Controller module 64 determines this operational status in accordance with signals supplied from DSP module 52. As shown in FIG. 3, DSP module 52 is configured to provide two discrete bandlimited filtering functions. One function serves as a CAT filter 66, which monitors signals passed through CAT-controlled echo canceler 24 to detect and indicate the presence of the CAT tone discussed above. Another function serves as a disable filter 68, which monitors signals passed through CAT-controlled echo canceler 24 to detect and indicate the presence of the disable tone discussed above. Each of filters 66 and 68 couple to controller 64, and each of filters 66 and 68 takes the form shown in FIG. 4.

Figure 4:
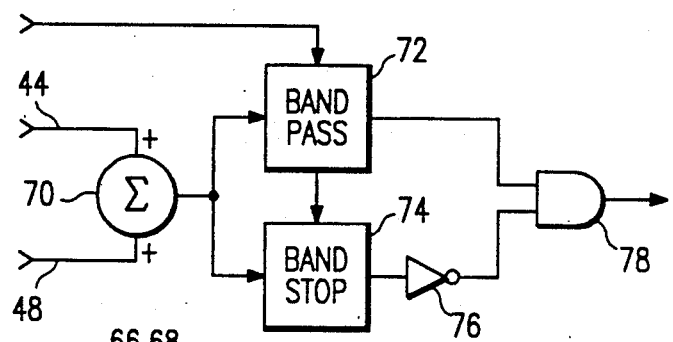
FIG. 4 shows a block diagram of a filter portion of the present invention.

Specifically, as shown in FIG. 4, each of filters 66 and 68 sum signals received from near-end input 44 and far-end input 48 together in an adder 70. An output from adder 70 couples to an input of a bandpass filter 72 and an input of a bandstop filter 74. Bandpass filter 72 indicates when a tone of a specified frequency is present on either input 44 or 48, and bandstop filter 74 indicates when frequencies other than the specified frequency are present at inputs 44 or 48. For CAT filter 66, the specified frequency is approximately 2010 Hz, and for disable filter 68, the specified frequency is approximately 2100 Hz. The output from bandstop filter 74 is inverted in element 76 and combined in AND logical element 78 with the output signal from bandpass filter 72. The filter's output is provided from element 78. Thus, filters 66 and 68 indicate when the specified frequencies are exclusively present.

Referring back to FIG. 3, in the preferred embodiment controller module 64 includes conventional microprocessor circuits 80, memory circuits 82, and timer circuits 84. Circuits 80-84 couple together to form a conventional computer. Moreover, filters 66 and 68 are both implemented within a single DSP chip using conventional digital filtering techniques such as infinite impulse response (IIR) filtering. The coefficients which determine frequency selectivity of filters 66 and 68 are supplied to DSP 52 from memory 82 under the control of microprocessor 80. Depending on maximum operating frequencies of DSP 52 and circuits 80-84, DSP 52 and microprocessor 80 may advantageously share memory 82 through a direct memory access (DMA) architecture. Consequently, DSP 52 implements both filters 66 and 68 by alternating coefficients utilized thereby during each sample of data provided at inputs 44 and 48. Specific techniques of implementing digital filtering using DSP chips are well known in the art and need not be discussed further herein.

Controller module 64 performs various sequences of tasks which are defined by a computer program stored in memory 82 and executed by microprocessor 80. Tasks related to controlling the operational status of echo canceling are of particular importance to the present invention. Such tasks are illustrated by the flow chart of FIG. 5.

Figure 5:
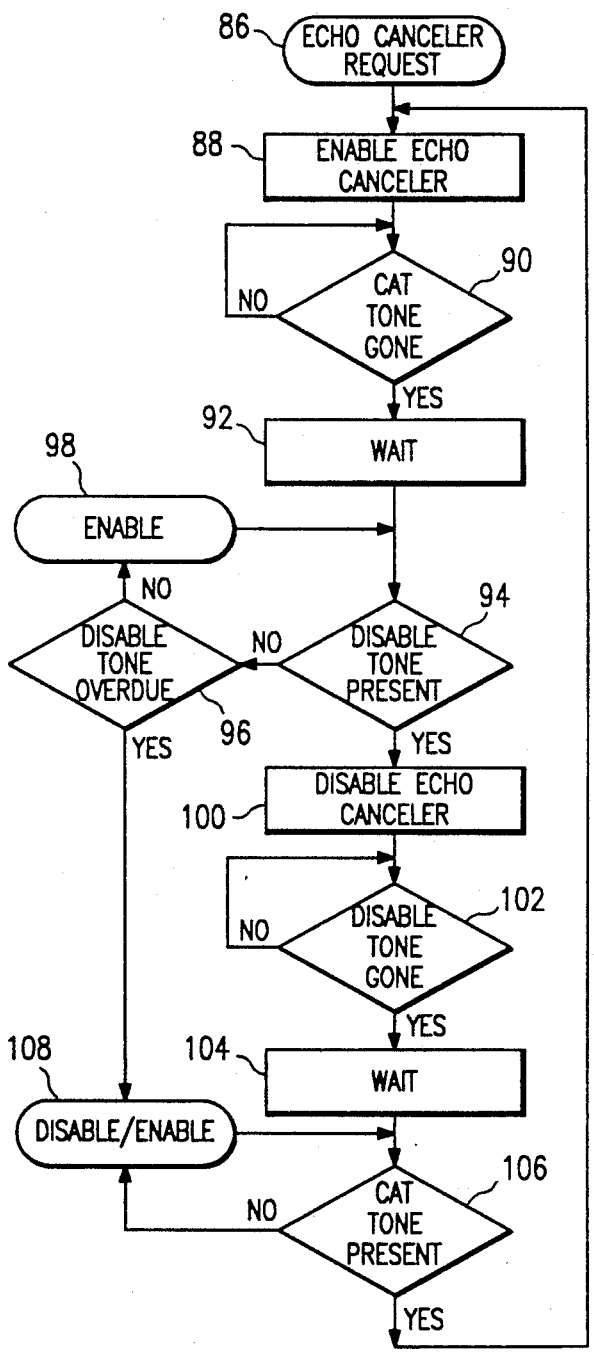
FIG. 5 shows a flow diagram of tasks performed by the CAT-controlled echo canceler of the present invention.

FIG. 5 shows a program loop which, for the purposes of teaching the present invention, is arbitrarily shown as being entered from a point 86 to a task 88. Task 88 enables echo canceling, preferably by appropriately setting a control bit. As discussed above in connection with FIG. 3, a control output from controller 64 couples to the control input of switch 62, and task 88 sets this control output so that the output signal from residual suppressor 60 couples through switch 62 to far-end output 50.

After task 88, a task 90 tests the output from filter 66 to determine whether the CAT tone is present. Normally, task 88 enables echo canceling only after the CAT tone has been detected. The precise duration of the CAT tone is difficult to predict for all, circumstances. Thus, task 90 simply waits until the CAT tone disappears before proceeding with the sequence. When the CAT tone disappears, a time stamp from timer 84 (see FIG. 3) may be recorded (not shown) for later use. After task 90, a task 92 causes the program sequence to wait an additional predetermined period of time before proceeding. Preferably, this predetermined period of time is less than the time required to perform tasks 36 and 38, discussed above in connection with FIG. 2.

The CAT tone and the disable tone are close to one another in frequency In the preferred embodiment the CAT tone exhibits 2010 Hz and the disable tone exhibits 2100 Hz. Consequently, depending upon design parameters which are under the control of the designer, a lower portion of the bandwidth of filter 68 (see FIG. 3) may overlap an upper portion of the bandwidth of filter 66 (see FIG. 3). As a result, a valid CAT tone may have an influence on disable filter 68 which is difficult to predict in all circumstances. Tasks 90 and 92 together operate to reduce any influence the CAT tone may have on disable filter 68. This improves the reliability of the present invention by reducing the likelihood of falsely detecting a disable tone when no such tone is present.

After task 92, a task 94 tests the output from filter 68 (see FIG. 3) to determine whether the disable tone is present. Task 94 contemplates the use of various averaging techniques to insure that it acts only on a reliable indication of the presence of the disable tone. If no disable tone is detected, the program proceeds to a task 96, which inquires whether the disable tone is overdue. This inquiry may be performed by comparing a current time stamp with a time stamp recorded immediately after the CAT tone disappeared. The precise duration which must transpire before the disable tone is considered overdue is not a critical parameter in the present invention, as long as it is longer than the time needed for tasks 36 and 38, discussed above in connection with FIG. 2, to occur. If the disable tone is not yet overdue, then the program loops back to task 94 to continue to monitor the output from filter 68 for an indication of the presence of the disable tone. As shown at state 98, CAT-controlled echo canceler 24 (see FIGS. 1 and 3) remains in its enabled state.

When the disable tone is detected, program flow proceeds from task 94 to a task 100. Task 100 disables echo canceling. Specifically, the control bit which operates switch 62 (see FIG. 3) may be placed in an opposite state from that discussed above in connection with task 88. As a result, echo canceler module 54 is bypassed because switch 62 routes signals from near-end input 44 directly to far-end output 50.

After task 100, a task 102 monitors the output from disable filter 68 (see FIG. 3) to detect when the disable tone disappears. After the disable tone disappears, program flow proceeds to a task 104, which waits a predetermined period of time before proceeding. Tasks 102 and 104 operate similarly to tasks 90 and 92 discussed above. Thus, tasks 102 and 104 together permit a period of time to transpire after the disable tone disappears, to reduce any influence the disable tone may have on CAT filter 66 (see FIG. 3). As a result, the likelihood of falsely detecting the presence of a CAT tone when no such tone exists is reduced. The precise period of time imposed by task 104 is not critical in the present invention, as long as it is less than a minimum time required for tasks 40, 42 and 32 discussed above in connection with FIG. 2.

After task 104, program flow proceeds to a task 106, which tests the output from filter 66 (see FIG. 3) to determine whether a CAT tone is present. Like task 94, task 106 contemplates the use of various averaging techniques to insure that it acts only on a reliable indication of the presence of the CAT tone. If no CAT tone is detected, the program loops back to task 106 through state 108 to continue to monitor the output from filter 66. As shown at state 108, CAT-controlled echo canceler 24 remains in its disabled state if it had been previously disabled in task 100, and remains in its enabled state if a disable tone was declared overdue in task 96 discussed above. When a CAT tone is eventually detected, program flow loops back to task 88, discussed above.

In summary, the present invention provides an improved method and apparatus for controlling the operational status of an echo canceler. The present invention relies upon the detection of CAT and disable tones which are currently used by telecommunications networks. As a result, the present invention provides for inexpensive, reliable control of echo canceling without modification of existing telecommunications equipment. Moreover, the present invention provides for the enabling of echo canceling without relying upon complicated signal analysis of communication being transported through a communication path. Specifically, echo canceling is enabled prior to each call. If any call requires echo canceling to be disabled, that call transmits a disable tone. Once disabled, echo canceling remains disabled through the duration of the call and inter-call gap until a subsequent call is initiated.

The present invention has been described above with reference to a preferred embodiment. However, those skilled in the art will recognize that changes and modifications may be made in this preferred embodiment without departing from the scope of the present invention. For example, those skilled in the art may devise alternate disabling mechanisms other than the switch discussed above. Such mechanisms may force the adaptive filter to output a zero value and disable the residual suppressor to bypass echo canceling. Moreover, the precise implementation techniques may vary widely. Analog technology may be used to implement one or more of the modules discussed above. Furthermore, the above-discussed modules may be predominantly implemented using either hardware or software components. These and other changes and modifications which are obvious to those skilled in the art are intended to be included within the scope of the present invention.

What is claimed is:

1. A method of controlling an echo canceler included in a communication channel of a telecommunications network, said telecommunications network generating a Continuity Assurance Test (CAT) tone to verify continuity of said communication channel, said method comprising the steps of:
   monitoring said communication channel to detect the presence of signals exhibiting a first frequency substantially equal to a frequency exhibited by said CAT tone;
   monitoring said communication channel to detect the presence of signals exhibiting a second frequency;
   enabling said echo canceler upon detection of said first frequency; and
   disabling said echo canceler upon detection of said second frequency.

2. A method of operating a telecommunications network which couples to first and second station sets and which includes an echo canceler, said method comprising the steps of:
   establishing a communication channel through said telecommunications network, said communication channel including said echo canceler therein;
   generating a continuity signal within said telecommunications network to verify said communication channel;
   monitoring, in said echo canceler, said communication channel to detect the presence of said continuity signal;
   enabling echo canceling by said echo canceler upon detection of said continuity signal;
   coupling said first and second station sets to said communication channel to establish a call between said station sets;
   monitoring said station sets to detect an end of said call; and
   disabling said communication channel through said telecommunications network.

3. A method as claimed in claim 2 additionally comprising the steps of:
   monitoring, in said echo canceler, said communication channel to detect the presence of an echo disabling signal;
   transmitting an echo disabling signal from one of said station sets through said communication channel; and
   disabling echo canceling by said echo canceler upon detection of said echo disabling signal.

4. An apparatus for controlling operational status of an echo canceler, said apparatus comprising:
   means for receiving a first signal, which said echo canceler monitors in order to selectively remove echo from a second signal;
   a first filter coupled to said receiving means, said first filter being configured to indicate when said first signal exhibits a first frequency;
   a second filter coupled to said receiving means, said second filter being configured to indicate when said first signal exhibits a second frequency, said second frequency being different from said first frequency; and
   a controller, coupled to said first and second filters, said controller being configured to:
      enable said echo canceler upon detection of said first frequency by said first filter, and
      disable said echo canceler upon detection of said second frequency by said second filter.

5. An apparatus as claimed in claim 4 wherein:
   said apparatus additionally comprises means for receiving said second signal;
   said first filter additionally couples to said second signal receiving means; and
   said first filter is configured to indicate when either one of said first and second signals exhibits said first frequency.

6. An apparatus as claimed in claim 5 wherein:
   said second filter additionally couples to said second signal receiving means; and
   said second filter is configured to indicate when either one of said first and second signals exhibits said second frequency.

7. An apparatus as claimed in claim 4 wherein said first filter is configured to indicate when said first signal has a spectral content consisting substantially of only said first frequency.

8. An apparatus as claimed in claim 7 wherein said second filter is configured to indicate when said first signal has a spectral content consisting substantially of only said second frequency.

9. An apparatus as claimed in claim 4 wherein said second filter is configured to indicate when said first signal has a spectral content consisting substantially of only said second frequency.

10. An apparatus as claimed in claim 4 wherein said first filter is configured so that said first frequency approximately equals a frequency of a Continuity Assurance Test (CAT) tone of a telecommunications network.

11. An apparatus as claimed in claim 10 wherein said second filter is configured so that said second frequency is approximately 2100 Hz.

12. An apparatus as claimed in claim 4 wherein:
   said first filter is configured to have a first bandwidth;
   said second filter is configured to have a second bandwidth wherein a portion of said first bandwidth overlaps a portion of said second bandwidth; and
   said controller is additionally configured to monitor timing of said detection of said first and second frequencies by said first and second filters, respectively, to distinguish the presence of said first frequency from the presence of said second frequency.

13. A combination which operates to selectively attenuate echo from a first signal in a communication channel of a telecommunications network, said combination comprising:
   a terminal adapted to receive a second signal in said communication channel of said telecommunications network, said second signal propagating in an opposite direction from said first signal;
   a first bandlimited filter coupled to said terminal, said first filter being configured to indicate a substantially exclusive occurrence of a first frequency in said second signal;
   a second bandlimited filter coupled to said terminal, said second filter being configured to indicate a substantially exclusive occurrence of a second frequency in said second signal, said second frequency differing from said first frequency; and an echo canceler being configured to transmit said first signal therethrough and to selectively attenuate echo originating from said second signal in said first signal, said echo canceler additionally having a control input for receiving a control signal which defines one of an enabled and a disabled mode of operation for said echo canceler; and a controller being coupled to said first and second filters and to said control input of said echo canceler, said controller being configured to cause said echo canceler to operate in:
  said enabled mode of operation upon indication of said first frequency by said first filter, and
  said disabled mode of operation upon indication of said second frequency by said second filter.

14. A combination as claimed in claim 13 wherein:
said first filter is adapted to receive said first signal and is configured to indicate a substantially exclusive occurrence of said first frequency in either one of said first and second signals; and
said second filter is adapted to receive said first signal and is configured to indicate a substantially exclusive occurrence of said second frequency in either one of said first and second signals.

15. A combination as claimed in claim 13 wherein
said telecommunications network generates a Continuity Assurance Test (CAT) tone to verify continuity of said communication channel; and
said first filter is configured so that said first frequency approximately equals the frequency of said CAT tone.

16. A combination as claimed in claim 13 wherein:
said first filter is configured to exhibit a first bandwidth;
said second filter is configured to exhibit a second bandwidth, wherein a portion of said first bandwidth overlaps a portion of said second bandwidth; and
said controller is additionally configured to monitor timing of said indications of said first and second frequencies provided by said first and second filters, respectively, to distinguish the presence of said first frequency from the presence of said second frequency.

* * * * *